United States Patent [19]
Hale

[11] Patent Number: 5,239,874
[45] Date of Patent: Aug. 31, 1993

[54] METHOD OF MONITORING THE CONDITION OF A MOTOR OPERATED VALVE SYSTEM

[75] Inventor: Stanley N. Hale, Cobb County, Ga.

[73] Assignee: Westinghouse Electric Corp., Pittsburgh, Pa.

[21] Appl. No.: 540,577

[22] Filed: Jun. 19, 1990

[51] Int. Cl.⁵ .................... G01M 19/00; G01L 5/00; F16K 37/00

[52] U.S. Cl. .................. 73/862.191; 73/168; 324/158 MG

[58] Field of Search ........... 73/862.19, 862.27, 862.28, 73/862.31, 862.49, 168; 324/158 MG

[56] References Cited

U.S. PATENT DOCUMENTS

| | | | |
|---|---|---|---|
| 4,831,873 | 5/1989 | Charbonneau et al. | 73/168 |
| 4,869,102 | 9/1989 | Hale et al. | 73/168 |
| 4,888,996 | 12/1989 | Rak et al. | 73/168 |
| 4,965,513 | 10/1990 | Haynes et al. | 324/158 MG |
| 5,009,075 | 4/1991 | Okoren | 324/158 MG |
| 5,029,597 | 7/1991 | Leon | 137/1 |

Primary Examiner—Charles A. Ruehl

[57] ABSTRACT

A method of evaluating degradations throughout a MOV (i.e. motor operated valve) by establishing specific interrelationships between a power related parameter from the MOV motor (being, for an AC motor, preferably the motor load; and being, for a DC motor, preferably motor torque or motor torque factor) and actuator torque; then utilizing the established interrelationships to further establish a given percent change in the power related parameter as a warning point; and, then, trending the power related parameter during valve-in-use operation of the valve system to evaluate the condition of the valve system.

17 Claims, 9 Drawing Sheets

METHOD OF MONITORING THE CONDITION OF A MOTOR OPERATED VALVE SYSTEM

FIELD OF THE INVENTION

This invention relates generally to the field of testing and diagnosis of motor operated valve systems.

BACKGROUND OF THE INVENTION

The nuclear regulatory agencies of the United States have established numerous testing and diagnostic requirements to ensure that all safety related, position changeable motor operated valves ("MOV's") are capable of operating during design basis events. One such recent requirement calls for an initial test program for establishing and implementing correct control switch settings on all safety related MOV'S within a nuclear plant or facility. A correct MOV switch setting allows adequate torque/thrust to close the valve against a "differential pressure force". Differential Pressure may be defined as the fluid system, internal pressure which the motor operator must overcome when the valve is opening or closing and is near the full closed position, in which position the system pressure will usually be the highest on the pump side of the valve and minimal on the downstream side. "Differential pressure force" may be defined as the product of the differential pressure multiplied by valve area then by a representative friction coefficient, plus the product of the line pressure multiplied by the cross sectional area of the stem. When setting the switch, a "margin" is provided which is, actually, a conservatism in the setting. For example, if the correct switch setting required 15,000 pounds of thrust and the actual setting was 17,000 pounds, the margin would be 2000 pounds.

Following this initial (or baseline) testing, periodic testing is required to identify degradations and to insure that settings remain adequate during the life of the facility.

It should be noted that the MOV actuator is typically controlled by a torque switch and, thus, the adequacy of the torque switch setting depends on the actuator's conversion of torque to thrust. For example, the torque switch is set at "x" foot-pounds in expectation of delivering "y" pounds of thrust to the stem. There is a known concern that torque within the MOV may, due to certain degredations, be developed to a point high enough to trip the torque switch (i.e. "x" foot-pounds, thus shutting off the MOV motor) before the valve has indeed closed or opened (for example, before the stem load reached "y" pounds of thrust). In such a situation, it is typically explained that the allowance or "margin" provided during the baseline test has been "reduced" or extinguished. Previously in the industry, it has, thus, been determined to be a beneficial part of MOV diagnostics to periodically monitor the thrust margin to determine if sufficient thrust remains in the MOV to deliver the thrust required to open or close the valve.

One method for periodically monitoring the thrust margin involves going directly to the valve and measuring the available stem thrust. This approach identifies increases in stem running loads; however, it does not appear to sufficiently identify developing motor or actuator problems. Degradations in the motor or actuator could eventually result in insufficient torque to trip the torque switch. This condition normally leads to tripping thermal overloads or motor burn up.

The present inventor has earlier developed and (his assignee) marketed valve operator diagnostic systems for monitoring of power parameters such as power factor or motor load to detect depletion of thrust margin. Examples of such systems are seen in U.S. Pat. Nos. 4,831,873 and 4,869,102. These systems utilized simulated or calculated stem running loads (thrust) to develop a direct relationship between a power parameter and the stem load during running condition; then used this relationship to set up a threshold value for the power parameter based on a maximum allowable stem thrust depletion; and then periodically monitored the power parameter for comparison to the threshold. Such systems, in effect, substituted the power parameter measurement for the direct measurement (mentioned above) of the stem thrust. Thus, such systems are subject to similar short comings of the first method mentioned above. In an ongoing attempt to address the problems of such valve monitoring, the present inventor has recognized a need for an improved method of monitoring margin in situations where extended intervals exist between tests; it having been recognized by the inventor that the relationships between the power parameter and the stem thrust established by his earlier systems are not maintained after such intervals.

SUMMARY OF THE INVENTION

Briefly described, the present invention is unique in its recognition of the impact of the degradation in stem factor on the correlation between power parameters of the MOV motor and stem thrust over extended intervals between testing times, and the resultant impact on diagnostics of the MOV condition; where stem factor may be defined as the mechanical relationship between torque applied at the stem threads of the valve stem and the resulting stem thrust. Furthermore, the present invention relates to a particular method of monitoring the loss of margin, developed to address the discovered realization, which method comprises evaluating performance throughout the MOV by establishing a specific interrelationship among a power related parameter of the MOV motor, actuator output torque and stem thrust, taking stem factor into consideration; and then trending the power related parameter during valve-in-use operation of the valve system to evaluate the condition of the valve system. Though it is within the scope of the present invention to utilize any power related parameter of the motor, in the preferred embodiments, the power related parameter utilized is a parameter which corresponds to output power available in the motor to produce torque within the valve actuator. In embodiments involving AC motors, the power related parameter preferably chosen is the motor load. In embodiments involving DC motors, the power related parameter preferably chosen is a power/speed value which is referred to as motor torque (or, most preferably, the torque factor, which is representative of the motor output torque multiplied by a constant). The power related parameter is measured, in each of the preferred embodiments through an appropriate power parameter transducer. The power parameter transducer is used to measure the appropriate power related parameter of the motor during the running portion of the valve stroke. The present invention utilizes the established interrelationship among the power related parameter, the actuator output torque and the stem thrust to further establish a given percent change in the trended power related parameter value as a warning point (a level where compromise of operational readiness is being approached). Thereafter, the power related parameter is trended during valve-in-use operation and condition of the valve system is evaluated.

It is, therefore, an object of the present invention to provide a method of monitoring a motor operated valve system by establishing a valuable correlation among the power parameter transducer output, actuator output torque and stem thrust, and, thereafter, trending the power parameter transducer output.

Another object of the present invention is to provide a method of identifying unacceptable degradation of a motor operated valve system which method will achieve acceptable results even after the passage of time from initial establishment of a baseline condition.

Still another object of the present invention is to provide a method of monitoring loss of margin in a motor operated valve system, which method considers the impact of degrading stem factor on the margin.

Other objects, features and advantages of the present invention will become apparent upon reading and understanding this specification when taken in conjunction with the accompanying drawings.

DETAILED DESCRIPTION OF THE PREFERRED EMBODIMENT

Figure 1:
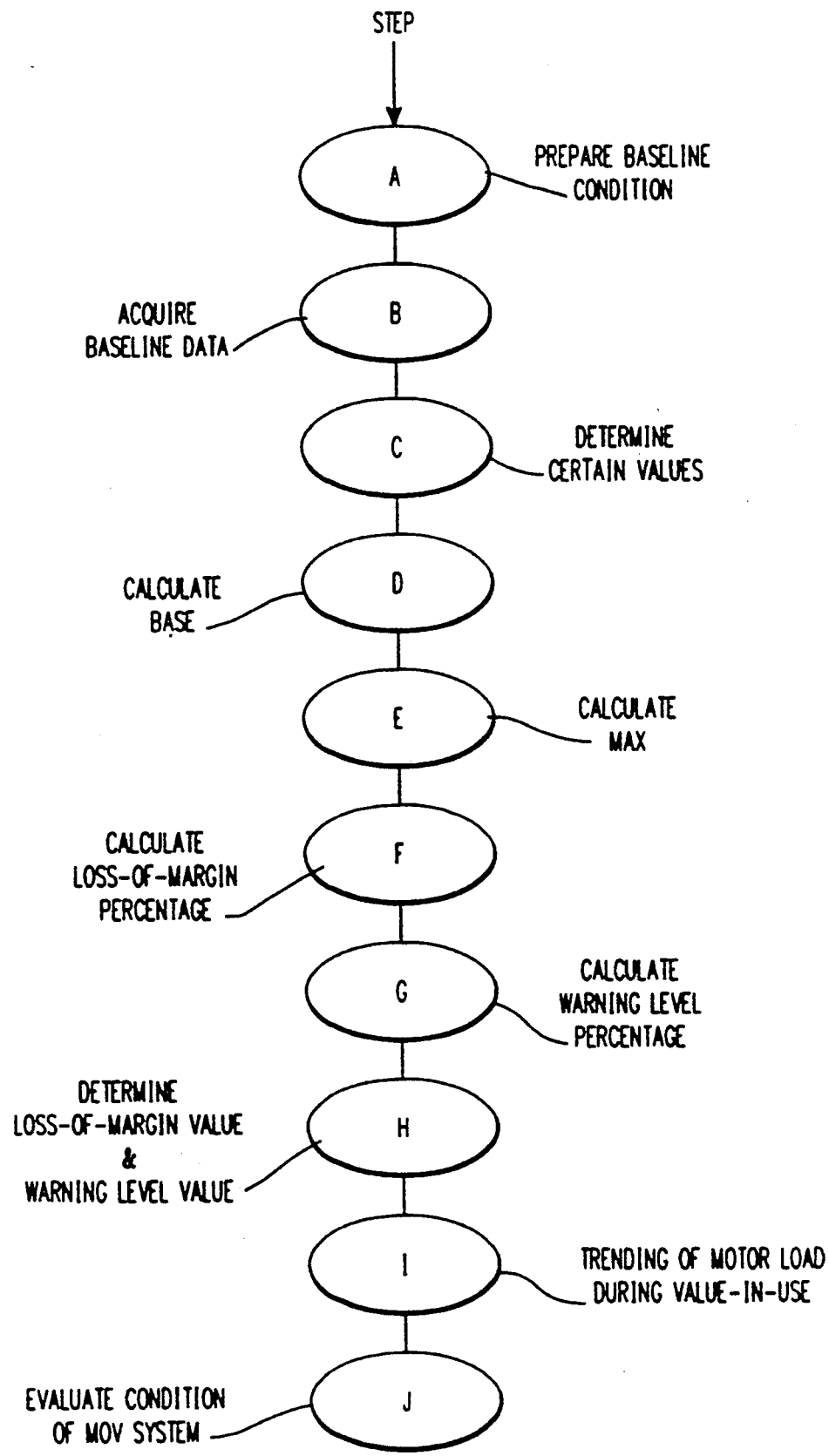
FIG. 1 is a schematic representation of a valve system monitoring method in accordance with the present invention.
Figure 2:
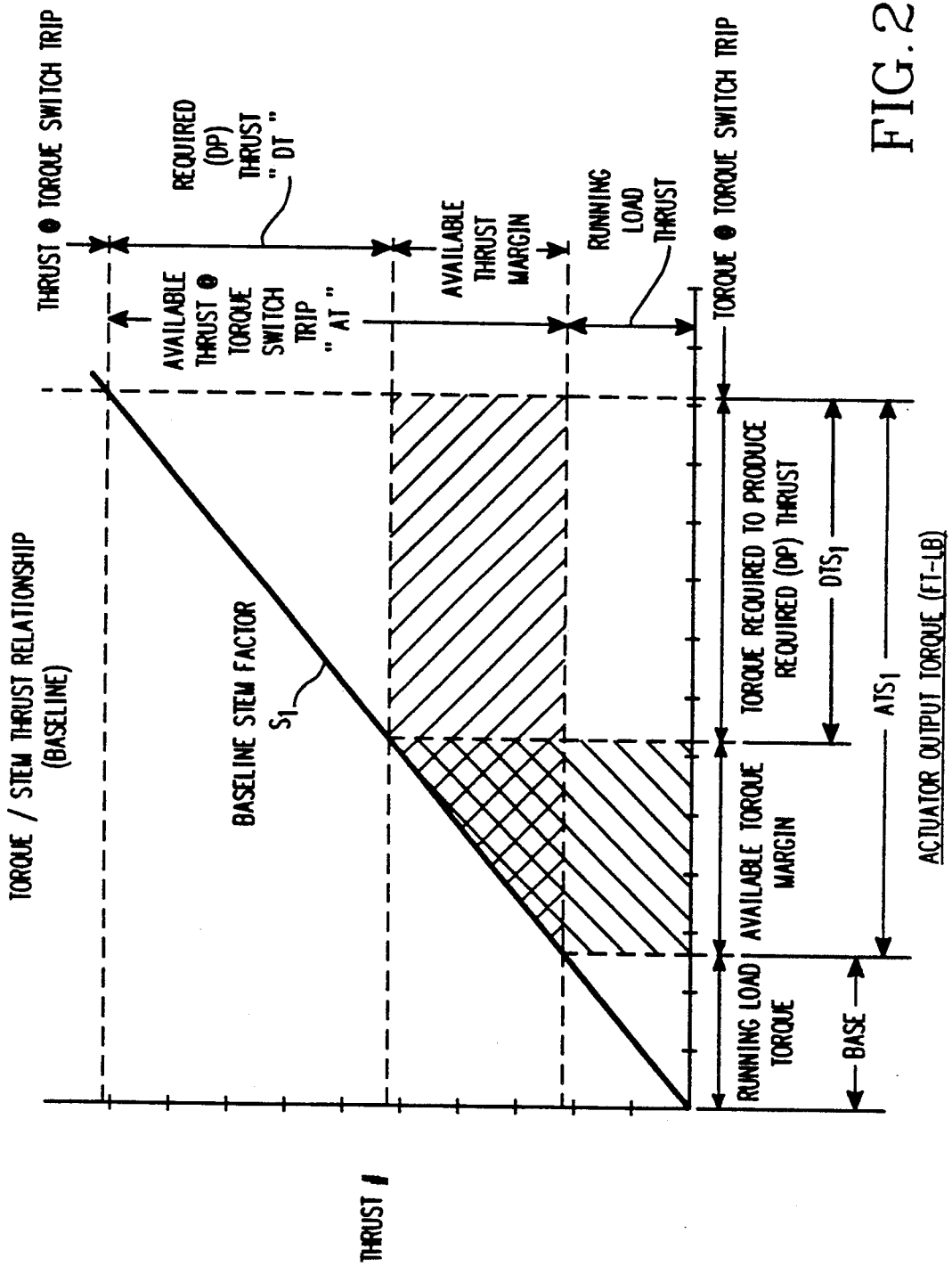
FIG. 2 is a graphic representation, in accordance with the present invention, of the thrust required for differential pressure, stem running loads and margin as they relate to valve actuator torque for a motor operated valve system, during baseline conditions.
Figure 3:
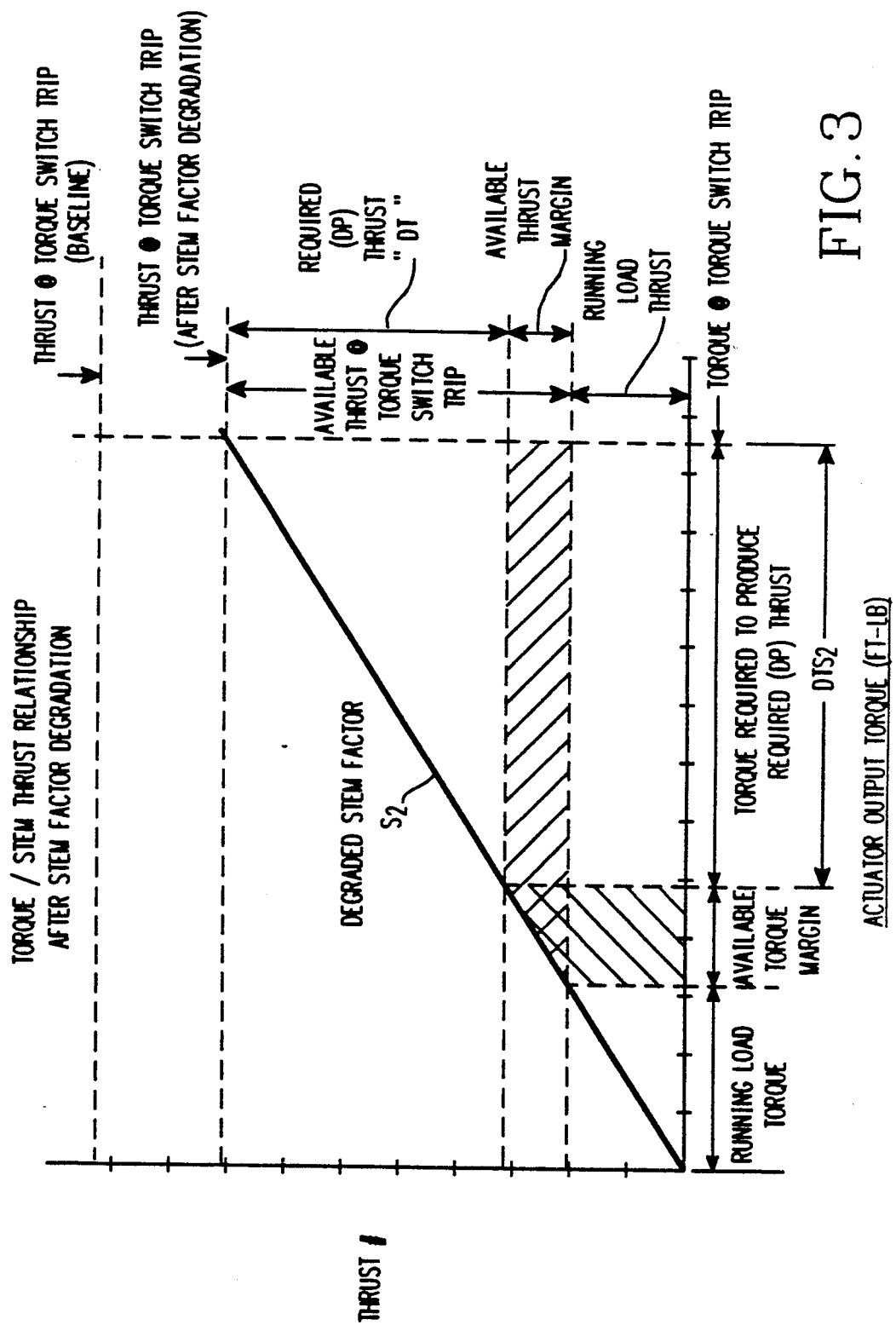
FIG. 3 is a graphic representation, in accordance with the present invention, of the thrust required for differential pressure, stem running loads and margin as they relate to valve actuator torque for a motor operated valve system, during a condition of degraded stem factor.
Figure 4:
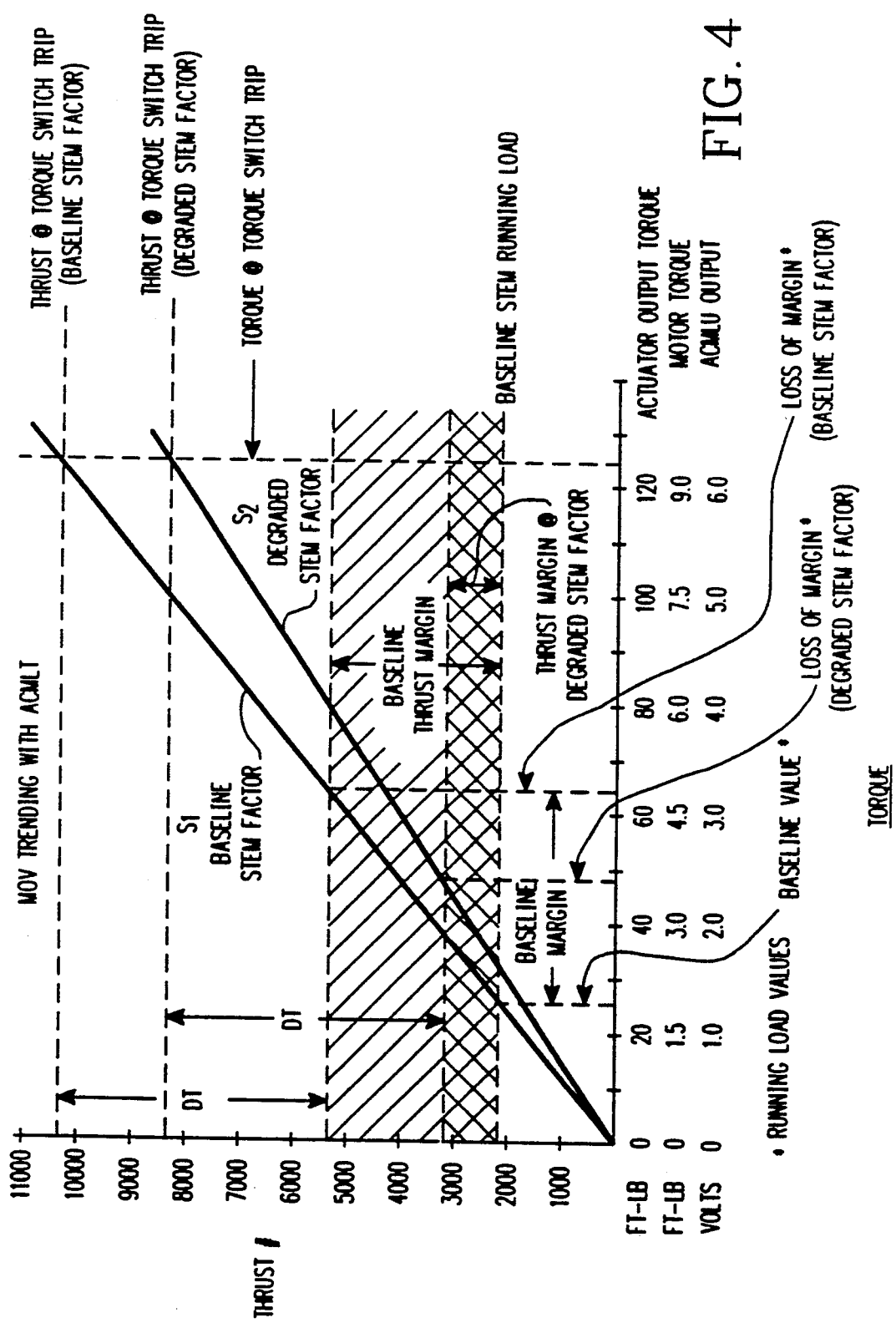
FIG. 4 is a composite FIG. 2 and FIG. 3.

Referring now in greater detail to the drawings, in which like numerals represent like components throughout the several views, FIG. 1 depicts one embodiment of the invented method, the steps of which are detailed below. FIGS. 2, 3 and 4 provide graphic assistance in understanding the terminology and the method set out below. The invention is not limited by the specific order of events described below, nor by the specific steps, nor by the specific grouping of activities a outlined in each step; rather, the below steps are offered as one outline for describing and understanding the present invention.

Throughout this detailed description, the power related parameter will be referred to as the motor load, as being the preferred embodiment for use with an AC motor environment. Rather than repeat the specification for the DC motor environment, it is to be understood, and considered described herein, that by substituting DC motor torque (or torque factor) for the motor load as the power related parameter, the foregoing detailed description is equally applicable as being the preferred embodiment for use with a DC motor environment. Appropriate DC transducers will be identified below, as required.

STEP A—Prepare the baseline condition. Prior to the acquisition of data, the MOV is serviced to place the MOV in a condition as near to its normal and non-degraded operating condition as possible. By "non-degraded" is meant a known baseline condition from which future measurements will be compared. Preferably, in preparing this "non-degraded" baseline condition, any necessary repair and/or maintenance is performed, such as packing adjustments, stem lubrication, switch setting, and other understood service. By "normal" is meant that, preferably, the baseline condition is to be similar to the normal conditions at which the MOV operates during the valve-in-use trending mentioned below: for example, if valve-in-use trending values are to be taken under dynamic conditions, one must consider such conditions as, but not limited to, line pressure and differential pressure; however, even if valve-in-use conditions are to be dynamic, acceptable embodiments of the present method allow for baseline conditions to be static while making adjustment for any difference in parameter values which may result between the baseline and the valve-in-use conditions.

STEP B—Acquisition of baseline data. During this step, the values of certain MOV parameters are acquired, during baseline running condition, by measurements utilizing appropriate transducers (see FIGS. 5A, 5B, 6, 7). The term "baseline running condition" is understood to mean operation of the MOV, under the above described baseline condition, through its opening and/or closing strokes, they being the "running strokes" or "running condition". Running condition does not include seating or unseating of the valve, which events create transient conditions. The parameters whose values are acquired will vary depending upon the embodiment of the invented method to be performed. In all preferred embodiments, the value of the baseline available stem thrust ("AT") prior to torque switch trip and the value of the baseline motor load ("V") are acquired. In various embodiments, one or more of the baseline stem thrust value ("P"), baseline actuator output torque value ("TQ") or baseline motor shaft torque value is acquired, each corresponding to (and, thus, "scaled" relative to) the baseline motor load value ("V"). Explanation of these parameters/values and preferred methods and apparatus of acquiring them are provided later in this specification.

STEP C—Determining values for accepted characteristics of the specific MOV being tested and determining values reflecting acceptable design basis conditions and degradation characteristics. Included in these values are, preferably, the valve actuator running efficiency ("E"), the actuator overall gear ratio ("R"), the stem thrust required to overcome maximum differential pressure (design basis condition) ("DT"), the stem factor at baseline condition ("$S_1$"), and the stem factor at degraded condition ("$S_2$"). Explanation of these values and preferred methods of acquiring them are provided later in this specification.

STEP D—Utilizing the above acquired and determined values, a value representative of the actuator output torque during baseline running condition is determined (and referred to herein as "BASE"). The preferred embodiments for determination of BASE are described later.

STEP E—Utilizing the above acquired and determined values, a value representative of the maximum actuator output torque to be allowed during running condition is determined (and referred to herein as "MAX"). This MAX is mentioned as being the maximum "allowed" since it is made dependant upon certain design condition choices and degradation expectations or predictions made by the user. That is, this is what the user will allow. The preferred embodiments for determination of MAX are described later.

STEP F—A percentage value representing the maximum allowed percentage of change in the actuator output torque is now determined. That is, a percentage is established showing the maximum amount, based on the baseline and design/degradation conditions, that the actuator output torque is allowed to change from BASE, during the running condition, before the MOV is considered by the user to be without sufficient thrust and/or torque to properly seat or unseat the valve. This percentage is referred to herein as the "Loss-of-Margin percentage". The Loss-of-Margin percentage is calculated, preferably, using the equation:

$$\left| \frac{MAX\text{-}BASE}{BASE} \right| \times 100 = \text{Loss-of-Margin percentage}$$

STEP G—In the preferred embodiments of the present invention, the method now calls for the introduction of a safety factor to give a greater margin of safety to warn the user before the maximum allowed percentage of change has been reached. This greater margin of safety is referred to herein as the "warning level percentage" and is calculated by the equation:

$$\left| \frac{\text{Loss-of-Margin percentage}}{\text{safety factor}} \right| = \text{warning level percentage}$$

The safety factor is a number greater than or equal to one. In embodiments where the user feels secure with the original Loss-of-Margin percentage, the safety factor is chosen as, for example, one. In the preferred embodiment, a safety factor of two is recommended.

STEP H—In accordance with the present invention, the maximum allowed percentage of change from baseline condition allowed to the actuator output torque is the same maximum percentage of change that will be allowed to the motor load value. Thus, a value is now determined for the "Loss-of-Margin value" which is the maximum value to which the motor load will be allowed to increase under running conditions:

[Loss-of-Margin percentage]×[V] = Loss-of-Margin Value

Furthermore, introduction of the safety factor provides a Warning Level Value for motor load:

[warning level percentage]×[V] = Warning Level Value

STEP I—Trending the motor load value during valve-in-use condition. Once a Warning Level Value and a Loss-of-Margin Value are obtained, they are used to evaluate changes in the motor load value over a trending period, during valve-in-use operation of the MOV. Preferably, the monitored value is the motor load during running load. The MOV is placed in operation and a motor load measuring unit is connected to the MOV, but preferably at the remote Master Control Center ("MCC") of the Plant/Facility. See FIG. 8 for one embodiment of the present invention showing the apparatus to perform the valve-in-use trending portion of the method. An example of an acceptable motor load measuring unit 75 is discussed later herein. The motor load value is measured, preferably continuously, over the trending period. In the depicted embodiment, the output from the motor load measuring unit 75 is conveyed by appropriate signal conveying cable to a signal conditioner 83 and then to a display (for example, a meter or oscilloscope) and/or recording device (for example, a computer memory device) 84. In the preferred embodiments, a printed, time related record of the trended motor load is provided to allow for scanning by the user of the motor load condition over a trending period.

STEP J—The user monitors the trended motor load value on a periodic basis at the master control center 90 or, in certain embodiments, at the MOV 16, and evaluates the MOV System condition. An increase in the trended motor load value over the baseline motor load value ("V") indicates that either the stem running load has risen or degradations have occurred which have caused an increase in the motor torque required to provide the running load stem thrust (or a combination of the two). Both events detract from the available thrust margin and thus, from the actuator's ability to provide required torque.

If the trended motor load value increases to the Warning Level Value, this indicates that an unacceptable degradation (based on the user's criteria) has occurred and that an evaluation of equipment capability is required. If the Loss-of-Margin Value has been reached (i.e beyond the warning level), it is an indication that margin has been consumed (i.e. perhaps stem/stem nut efficiency has degraded to the value used to calculate $S_2$) and that operational readiness may be compromised. The value should not intentionally be allowed to approach the Loss-of-Margin point without evaluation of the causes and remaining capability. The immediate corrective actions to be taken, should the trending value increase to the Warning Level Value, will be dependent on plant condition and valve accessibility. The initial evaluation should consider stem lubrication as the first step in determining the root case of the degradation. If stem lubrication does not decrease the trending value, then a complete retest at the valve may be required to determine if the problem is in the actuator or valve. Although the providing of a physical alarm is not a required step in the present invented method, alternate embodiments of the invention provide an audible alarm, printed flag, or other "alarm" to bring the approach of the loss-of-margin value and/or the warning level value to the attention of the user.

Apparatus. With reference to FIGS. 5A, 5B, 6 and 7, a representation is seen of the MOV outfitted for collection of baseline values required for the performance of the invented method, in accordance with certain preferred embodiments thereof. A detailed description of the MOV is not considered necessary here, MOV's being very well known and understood in the industry; however a general explanation is provided for identification of components mentioned herein. A motor operated valve system 16, of a type typically used in the art, is shown as having a motor 18 which drives a worm shaft 19, which drives a worm 20, which in turn drives a worm gear 21. The worm gear 21 is formed with a drive sleeve 22 into which is inserted and to which is splined a drive nut (not seen). The internally threaded drive nut drives an externally threaded valve stem 24. The valve stem 24 engages a valve shaft 27 to open or close the valve element 26 of the valve assembly 25. In order to absorb the rotating inertia of the motor 18 and to provide a mechanism for determining the torque load on the actuator, a cluster of precision compression springs 30 is provided at one end of the worm shaft 19. A torque switch assembly 32 is seen as connected by a post 33 to a spur gear 34 for movement in relation to the worm 20 and spring compression. The torque switch assembly 32 is of a type typical in the industry and generally includes a switch chamber 35 which houses an electrical/mechanical torque switch. (not seen). The valve assembly 25 which is seen in the drawings is a gate valve of the type typically known in the industry, other valve types being available. Gate valve assembly 25 includes a gate element 26 which is moved up and down perpendicular to the fluid flow through the piping 28.

FIGS. 5A-7 depict one embodiment of apparatus for acquiring the baseline values for motor load output value ("V"). In the case of an AC motor, the motor load output value is measured through the use of a power parameter transducer 75, preferably an AC motor load transducer 75 (also referred to herein as the "ACMLT" 75). AC motor load output is derived from motor voltage, current and power factor with compensation for motor efficiency losses. This provides a value proportional to active (or shaft) power. For an AC induction motor, this is also proportional to motor shaft torque. Values are taken during periods when loads are relatively constant. The value being trended is, therefore, the load on the motor of the motor during the running portion of the stroke (the above defined "running condition"). One acceptable example of a motor load transducer 75 is that known as the MOVATS® AC MLU manufactured and sold by Henze-Movats Incorporated of Atlanta, Ga., and operated in accordance with the manufacturer's instructions. This motor load transducer 75 is described, at least in an earlier version, in U.S. Pat. No. 4,869,102, which patent is by this reference made a part hereof. Associated with the motor load transducer 75 is a current transducer 79, one example of which is a FLUKE model Y1800, operated in accordance with manufacturer instructions. Other industry known instruments which accurately measure motor load are acceptable. Also associated with the motor load transducer 75 are a recording and/or display device 84, and, in a preferred embodiment, a signal conditioner 83.

In the preferred embodiments associated with DC motor environments, the power parameter transducer 75 is, preferably, a DC motor torque transducer. As expressed earlier, one preferred DC power related parameter used in accordance with the present invention is torque factor. This torque factor, and one acceptable example of a DC power parameter transducer 75 which is used to monitor the torque, is described in U.S. Pat. No. 4,888,996, which patent is by this reference made a part hereof. This example of the DC power parameter transducer is commercially available and known as the MOVATS® DCMTU manufactured and sold by Henze-Movats Incorporated of Atlanta, Ga., and operated in accordance with the manufacturer's instructions. Associated with the motor load transducer 75 is a current transducer 79, one example of which is a FLUKE model Y8100, operated in accordance with manufacturer instructions. The value being trended is, therefore, the torque load on the motor during the running portion of the stroke (the above defined "running condition").

Figure 5A:
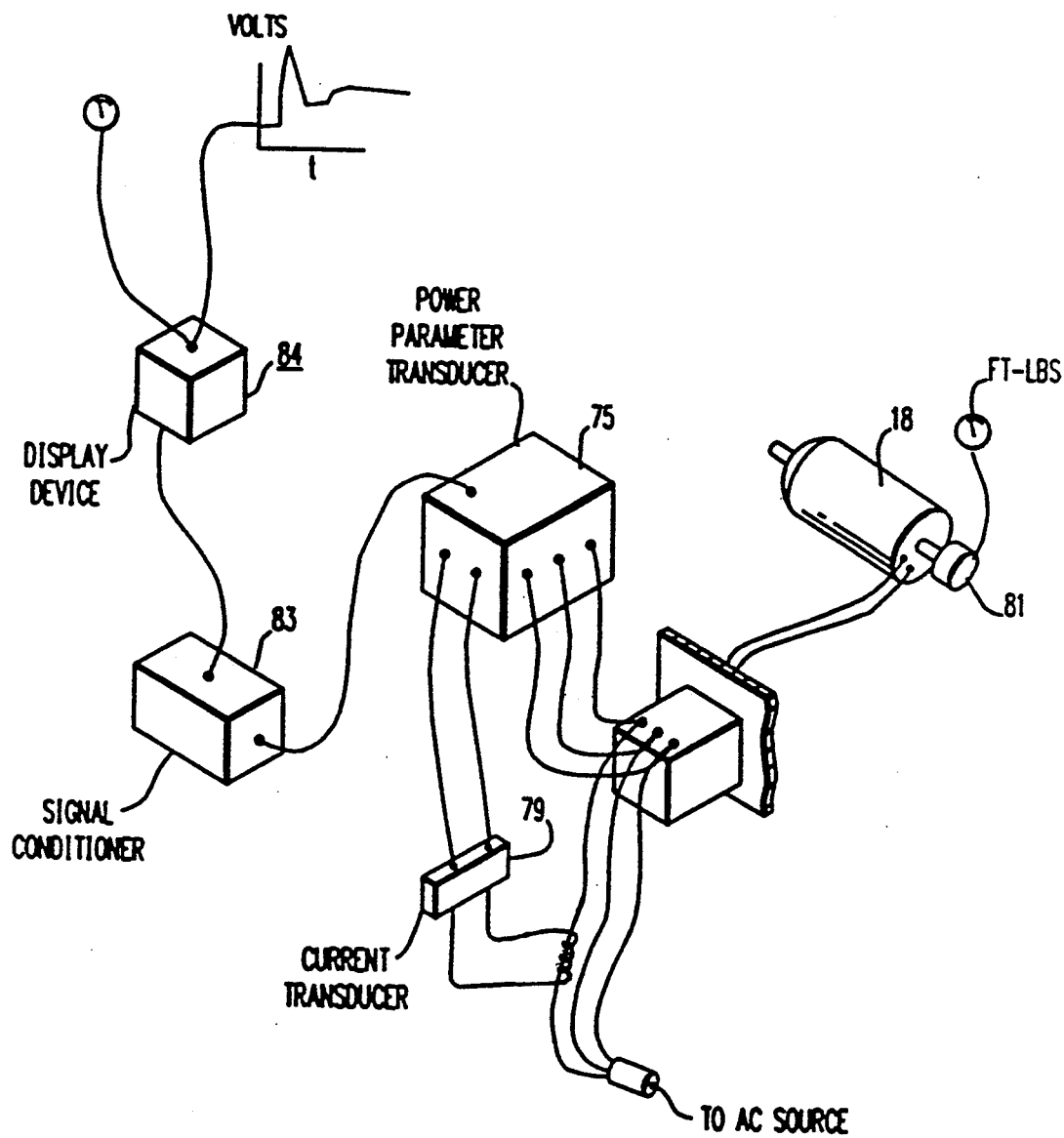
FIG. 5A is an isolated pictorial representation of elements of a motor operated valve system outfitted with elements of apparatus for acquiring of baseline data, in accordance with one embodiment of the present invention.
Figure 5B:
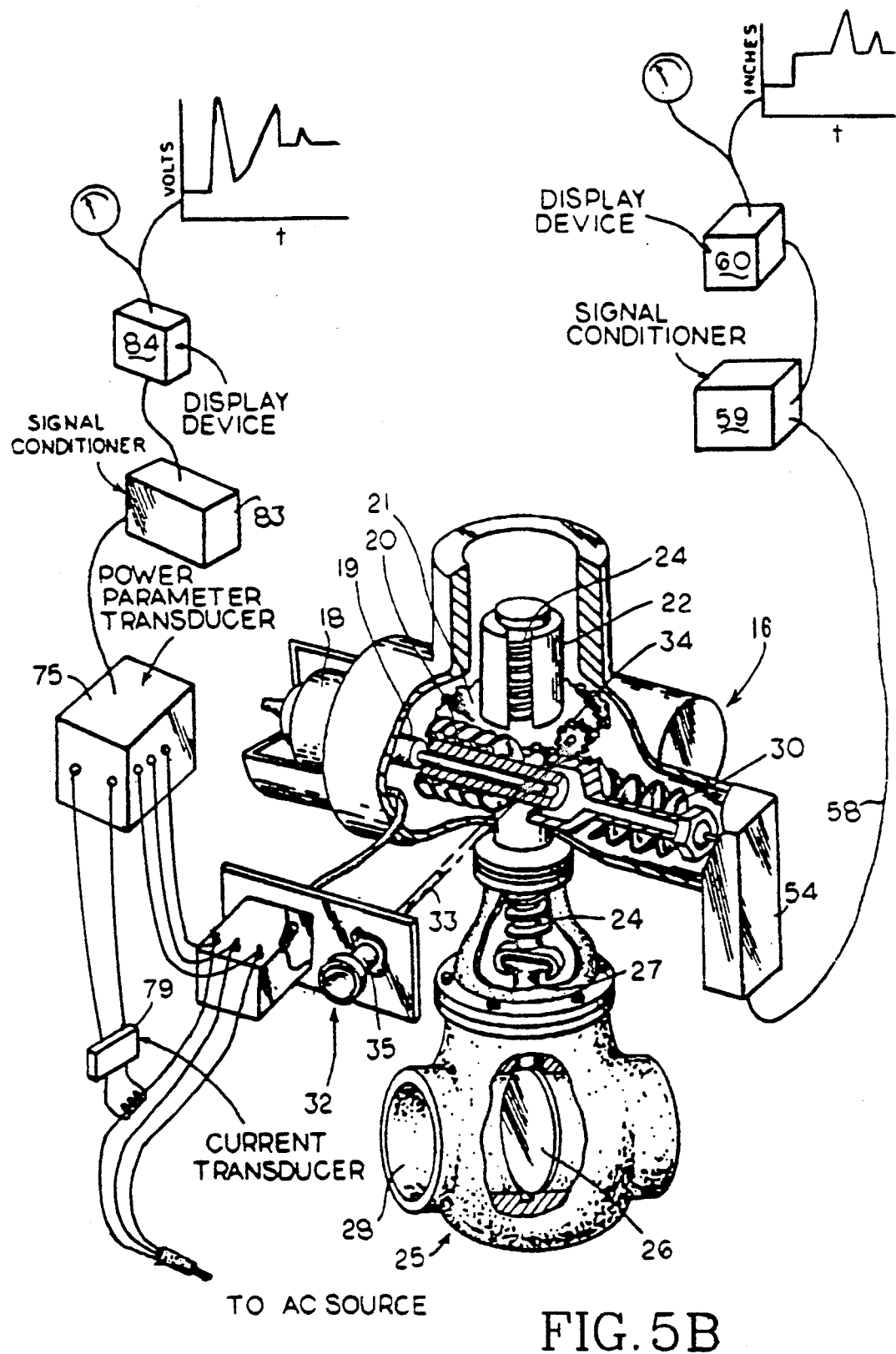
FIG. 5B is a pictorial representation, with parts broken away and parts isolated, of a motor operated valve system outfitted with apparatus for acquiring of baseline data, in accordance with one embodiment of the present invention.
Figure 6:
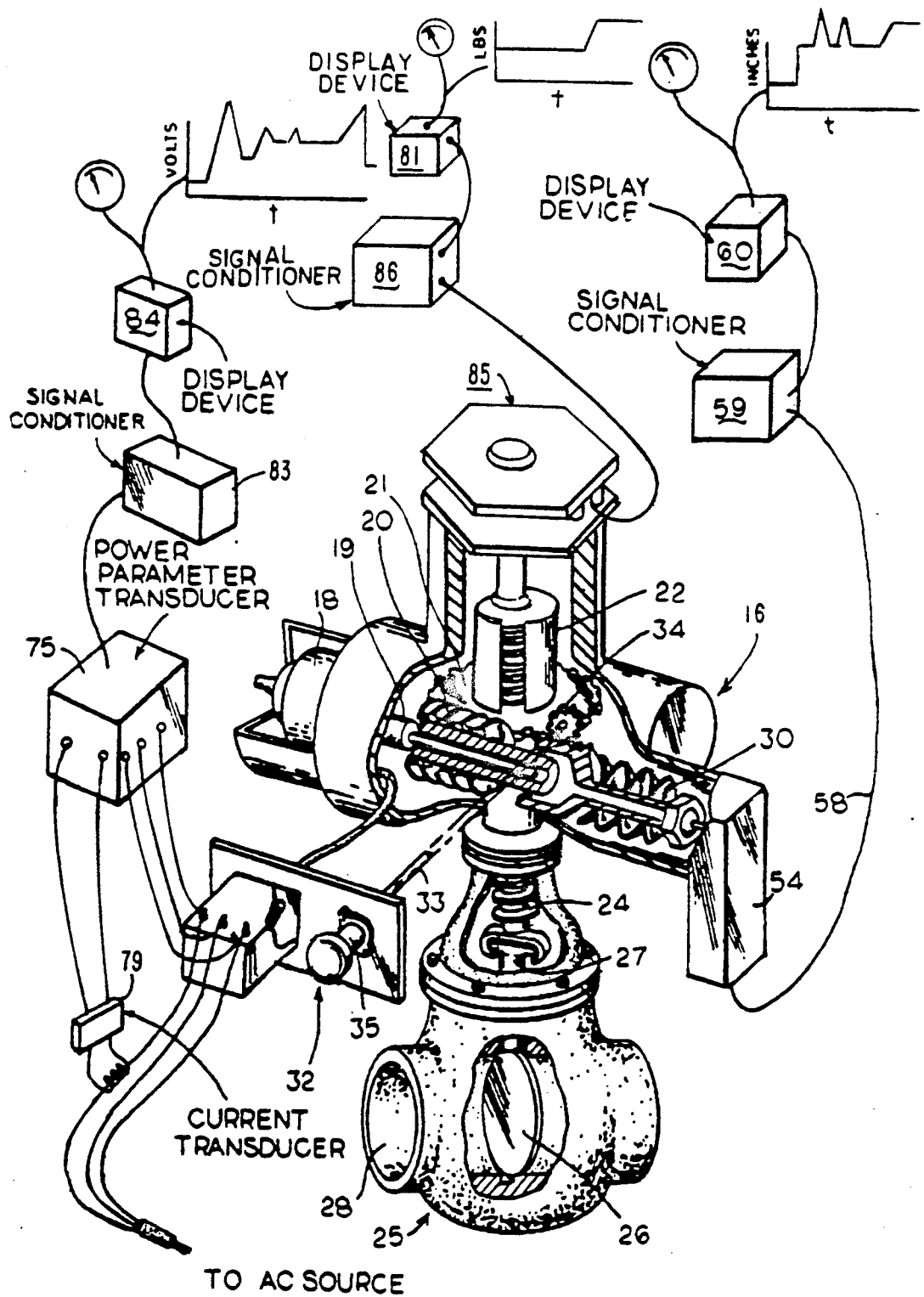
FIG. 6 is a pictorial representation, with parts broken away and parts isolated, of a motor operated valve system outfitted with apparatus for acquiring of baseline data, in accordance with a second embodiment of the present invention.
Figure 7:
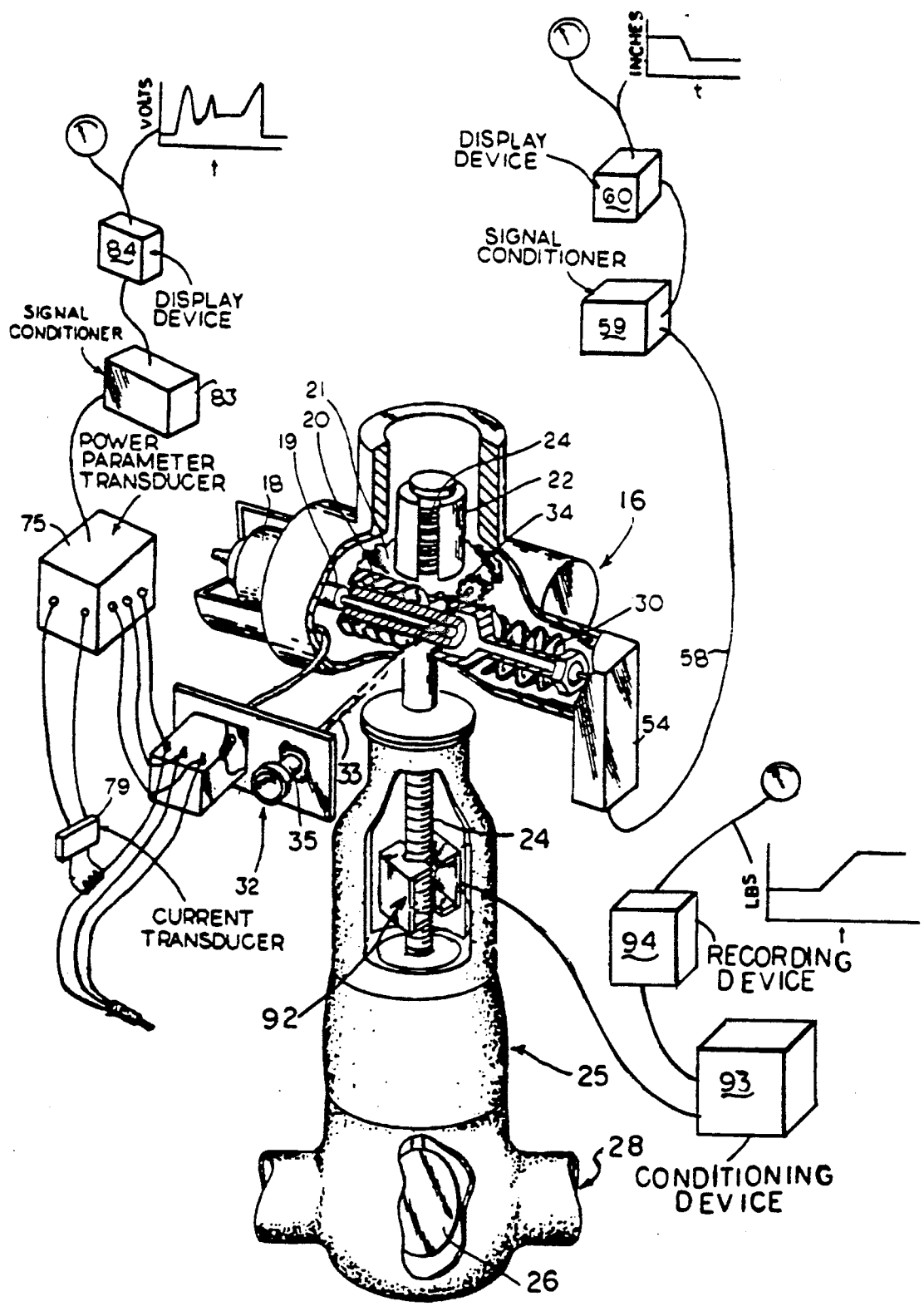
FIG. 7 is a pictorial representation, with parts broken away and parts isolated, of a motor operated valve system outfitted with apparatus for acquiring of baseline data, in accordance with a third embodiment of the present invention.

FIGS. 5B-7 also depict one embodiment of apparatus for acquiring the baseline value for available stem thrust prior to torque switch trip ("AT"). The available stem thrust ("AT") is measured using a load measuring device 54. In FIGS. 5-7, the load measuring device 54 is shown as being in the form of a spring pack movement monitoring device 54 which operates as an indicator of stem thrust in a manner described in U.S. Pat. No. 4,542,649, which patent is by this reference made a part hereof. Associated in the depicted embodiment with the load measuring device 54 are a signal conditioner 54 and a display (and/or recording) device 60. As understood in the art, the purpose of the signal conditioner is to provide a conditioned power supply for the device 54 and to provide necessary sub-components for generating and delivering the output signal to the display device 60.

FIGS. 5A and 5B depict an embodiment in which the value of the baseline motor shaft torque is measured by using a dynamometer 81 operated in a standard manner well understood in the industry. This motor shaft torque is used in one embodiment of the invented method in which a conversion factor ("F") is established between motor load and motor shaft torque. Although these values are proportional for a given motor, the constant varies from motor to motor due to size, design, manufacturing tolerances and motor condition. In this embodiment, the motor 18 is first disconnected from the worm shaft 19 and then connected to a dynamometer 81 and to the ACMLT 75 (see FIG. 5A). Dynamometer measurements are taken simultaneously with motor load measurements. From these measurements, the value of the conversion factor ("F") is established. The motor 18 is then reconnected to the worm shaft 19 (see FIG. 5B) and the baseline value for available stem thrust ("AT") is measured at the load measuring device 54.

FIG. 6 depicts an alternate embodiment in which baseline actuator output torque ("TQ") is directly measured by using a torque measuring device 85. One example of an acceptable actuator torque measuring device is the that known as the MOVATS ® TORQUE MASTER manufactured and sold by Henze-Movats Incorporated, and operated in accordance with the manufacturer's instructions. An early version of a torque measuring device of acceptable, though less preferred mode, is found in U.S. Pat. No. 4,759,224, made a part hereof by this reference. Associated with the torque measuring device 85 in the depicted embodiment are a conditioning device 86 and a display/recording device 87. The actuator output torque ("TQ") is used in an alternate embodiment of the invented method in which a relationship is established between the motor load value and the actuator output torque, and takes actuator efficiency into account by measurement rather than calculation.

FIG. 7 depicts an alternate embodiment in which the baseline stem thrust ("P") (and, in still an alternate embodiment, also the available stem thrust prior to torque switch trip "AT") is measured by using a stem strain measuring device 92. Two examples of an acceptable stem strain measuring device 92 are those known as the MOVATS ® SSR and the MOVATS ® SST manufactured and sold by Henze-Movats Incorporated, and operated in accordance with the manufacturer's instructions. An early version of the MOVATS ® SSR is described in U.S. Pat. No. 4,936,150, the specification of which is hereby made a part hereof by this reference. An early version of the MOVATS ® SST is described in U.S. Pat. No. 4,930,228, the specification of which is hereby made a part hereof by this reference. Associated with the stem strain measuring device 92 in the depicted embodiment are a conditioning device 93 and a display/recording device 94. The baseline stem thrust ("P") is used in an alternate embodiment of the invented method in which a relationship is established between stem thrust and motor load.

In the preferred embodiments, the values of MAX and BASE and the Loss-of-Margin Value and Warning Level Value are calculated by a calculating device (not shown), such as a programmed computer, into which the appropriate acquired and determined values have been input. A specific example of a computer program used to appropriately operate a computer is not provided herein, it being considered that such a program may be readily written by one skilled in the art, given the detail provided in this specification.

Figure 8:
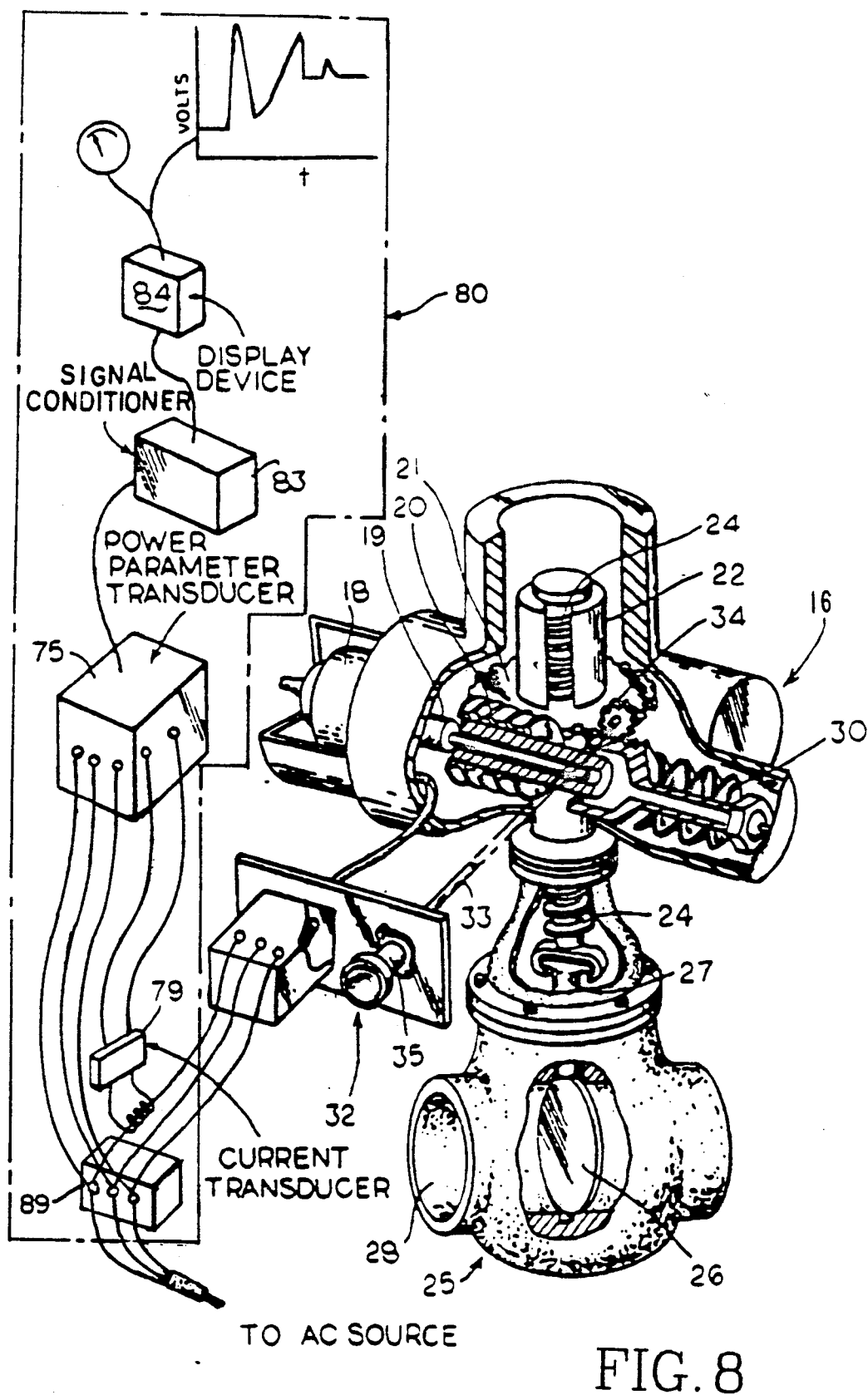
FIG. 8 is a pictorial representation, with parts broken away and parts isolated, of a motor operated valve system outfitted with apparatus for valve-in-use trending, in accordance with one embodiment of the present invention.

FIG. 8 depicts a preferred apparatus for the step of trending of the motor load value during valve-in-use operation of the valve (See steps I and J). Depicted therein is the motor load transducer 75 set up, preferably at a remote location such as the MCC 90 of the facility, for monitoring the motor load during the trending period. The ACMLT 75 is shown connected at the master control terminals 89 of the master control center 90.

Preferably, the respective conditioning devices 59, 83, 86, 93 are a single conditioning device feeding all transducers; and any conditioning device known in the industry which provides the necessary conditioned power and necessary components for generating and delivering the output signals is appropriate. One example of such a conditioning device is the MOVATS ® 3000 Data Acquisition Module, operated in accordance with manufacturers known methods. Preferably, the respective display/recording devices 60, 84, 87, 94 are a single display/recording device; and one example of an acceptable recording device is the MOVATS ® 2100 Mainframe, operated in accordance with manufacturer's instructions.

The method of the present invention is not to be limited by the apparatus depicted herein.

The Required Values. The following is an explanation of the various values acquired and/or determined in accordance with preferred methods of the present invention. A brief discussion of significance and direction of conservatism is given for each value.

"V"—The baseline power related parameter value. Once the motor load unit 75 (or the DC Motor Torque Unit 75) has been properly set up, in accordance with manufacturer's instructions, a baseline signature is taken for each direction of operation. The value is obtained by selecting the steady-state portion of the trace (running load) and taking a value at the highest steady state value. The reason for selection of a highest steady state value is that running loads usually oscillate or vary somewhat, and the object is to measure the full value of the load at this highest steady state value. Also, for the purpose of these calculations, a high value is conservative.

"R"—The actuator overall gear ratio. This value is the gear ratio between the motor shaft and the drive sleeve, usually stated in the actuator specifications. In a standard operator, this is the total ratio consisting of motor pinion/worm shaft ratio and worm/worm gear ratio.

"E"—The actuator running efficiency. This value is the efficiency of the actuator train from motor shaft to drive sleeve. A rated run efficiency value is normally stated by the manufacturer. If using a value other than this rating, a high efficiency figure is conservative in this case.

"AT"—The stem thrust available prior to torque switch trip. This value is obtained from diagnostic testing and setup data and is defined as the available stem thrust above running load at torque switch trip.

"DT"—The stem thrust required to operate the valve under maximum differential pressure (design basis condition). This value is calculated by an accepted method; either from an empirical data base or through the use of an appropriate engineering technique.

"$S_1$"—The calculated stem factor at baseline condition. This value represents the efficiency of the stem/stem nut drive, and is calculated or obtained from manufacturer's charts using an estimated value of the coefficient of friction. A coefficient of friction of 0.15 is widely accepted as being typical of a well lubricated stem in good condition. If more specific information is available, a coefficient of friction value believed to be more correct for the situation may be used. For these calculations, a low value of coefficient of friction (and thus, a higher efficiency) produces a more conservative baseline stem factor.

"$S_2$"—The calculated stem factor at degraded condition. This factor is derived in the same manner as $S_1$; however, a value of coefficient of friction representing maximum predicted (or allowed) degradation of stem/stem nut lubrication is used. A commonly used value is 0.20. Here again, if more specific information is available, it should be used. Since this value estimates a worst case efficiency, a higher value of coefficient of friction (lower efficiency) produces a more conservative acceptance criteria.

"F"—The conversion factor between AC motor load voltage (or DC motor torque voltage) and motor shaft torque. This value is derived empirically by taking AC motor load (or DC torque factor) measurements over time while operating the motor on a dynamometer at a specific torque load. This should be a specific value; however, an increase in this value would be conservative.

"P"—The stem thrust corresponding to the baseline motor load value. This is obtained by measuring stem thrust with a transducer (such as a stem strain measuring device 92 mentioned in previous discussion of FIG. 7) during the baseline monitoring and using the running load value from the portion of the stroke where baseline motor load value was taken. In a less preferred, alternate embodiment, the value of "P" is estimated; and one technique for stem running load estimation is multiplication of stem diameter at the packing gland (in inches) by 1000, used as a thrust value in pounds.

"TQ"—Actuator output run torque. The actuator output torque value corresponding to the baseline motor load value. This is obtained by measuring output torque during the measuring of baseline motor load and using the running load value. Again, this should be taken from the same portion of the stroke as the motor load value, as it is used to establish a relationship between the two.

MAX and BASE—(a) If working with the embodiment utilizing a dynamometer tested motor (See FIG. 5):

$$MAX = [AT(S_1) + (VFRE)] - [DT(S_2)]$$

$$BASE = VFRE$$

(b) If working with the embodiment utilizing a torque tested actuator (See FIG. 6):

$$MAX = [AT(S_1) + TQ] - [DT(S_2)]$$

$$BASE = TQ$$

(c) If working with the embodiment utilizing a baseline stem thrust running load (See FIG. 7):

$$MAX = [AT(S_1) + P(S_1)] - [DT(S_2)]$$

$$BASE = P(S_1)$$

Whereas this invention has been described in detail with particular reference to preferred embodiments thereof, it will be understood that variations and modifications can be effected within the spirit and scope of the invention, as described herein before and as defined in the appended claims.

We claim:

1. Method of identifying, during valve-in-use operation, an unacceptable degredation of the operating condition of a motor operated valve system, which system is comprised of a valve driven by a valve stem which is driven by a valve actuator which is driven by an electric motor, said method comprising the steps of:

establishing, for a specific valve system, a value (referred to as "BASE") representative of actuator output torque during baseline running conditions, baseline running conditions being defined as as near to normal, non-degraded running condition as possible for the valve;

establishing, for the valve system, a value (referred to as "MAX") representative of the maximum actuator output torque to be allowed during running condition, based on a predefined, allowed degraded stem factor;

determining the maximum allowed percentage increase in the actuator output torque from BASE during running condition by the formula:

$$\frac{\left|\frac{MAX-BASE}{BASE}\right| \times 100}{SAFETY\ FACTOR} = \text{"warning level percentage"},$$

wherein "safety factor" is a number greater than or equal to one;

establishing, for the valve system, a value of a selected power related parameter of the motor during baseline running conditions;

determining a warning value of the selected power related parameter as equal to the warning level percentage of the established baseline value of the power related parameter;

monitoring the selected power related parameter associated with the valve system during valve-in-use conditions; and evaluating changes in the value of the selected power related parameter over the monitoring period, whereby, an increase in monitored power related parameter value indicates a potential problem and an increase in the monitored parameter to the warning value indicates operational readiness may be compromised.

2. Method of claim 1, wherein the step of establishing BASE comprises, at least, the steps of:

measuring the motor shaft torque of the motor of the valve system, during baseline running conditions;

correlating the motor shaft torque to the power related parameter ("V") established during baseline running conditions to establish a conversion factor ("F") between the power related parameter and motor shaft torque;

determining the actuator overall gear ratio ("R") for the valve system;

determining the actuator running efficiency ("E") for the valve system;

calculating BASE from the equation:

$$BASE = VFRE.$$

3. Method of claim 2, wherein "R" and "E" are determined from specifications stated by the manufacturer of the valve actuator.

4. Method of claim 2, wherein the measuring step comprises the step of testing the motor on a dynamometer.

5. Method of claim 2, wherein the step of determining MAX comprises, at least, the steps of:

determining the total actuator output torque available to the valve stem between zero torque and torque at torque switch trip, during baseline running conditions;

determining the minimum actuator output torque required to overcome the maximum anticipated differential pressure, during a condition of maximum allowable degredation of the valve stem; and calculating MAX as the difference between the total actuator output torque available and the minimum actuator output torque required at the predicted degraded condition.

6. Method of claim 2, wherein the step of establishing MAX comprises, at least, the steps of:

determining a value ("AT") of the amount of stem trust available to the valve actuator between the running load and the thrust at torque switch trip, during baseline running conditions;

determining a value ("DT") of the stem thrust required to operate the valve under maximum anticipated differential pressure;

determining a value ("$S_1$") of the stem factor at baseline condition, which stem factor represents the efficiency of the stem/stem-nut drive of the valve system;

determining a value ("$S_2$") of the stem factor representing a maximum predicted degredation of stem/stem nut efficiency; and calculating MAX from the equation:

$$MAX = [AT(S_1) + BASE] - [DT(S_2)].$$

7. Method of claim 1, wherein the step of establishing BASE comprises, at least, the step of directly measuring the actuator output torque, during baseline running conditions.

8. Method of claim 7, wherein measuring step comprises the step of testing the actuator on a mechanical torque measuring device.

9. Method of claim 7, wherein the step of determining MAX comprises, at least, the steps of:

determining the total actuator output torque available to the valve stem between zero torque and torque at torque switch trip, during baseline running conditions;

determining the minimum actuator output torque required to overcome the maximum anticipated differential pressure, during a condition of maximum allowable degredation of the valve stem; and calculating MAX as the difference between the total actuator output torque available and the minimum actuator output torque required at the predicted degraded condition.

10. Method of claim 7, wherein the step of establishing MAX comprises, at least, the steps of:

determining a value ("AT") of the amount of stem thrust available to the valve actuator between the running load and the thrust at torque switch trip, during baseline running conditions;

determining a value ("DT") of the stem thrust required to operate the valve under maximum anticipated differential pressure;

determining a value ("$S_1$") of the stem factor at baseline condition, which stem factor represents the efficiency of the stem/stem-nut drive of the valve system;

determining a value ("$S_2$") of the stem factor representing a maximum predicted degredation of stem/stem nut efficiency; and calculating MAX from the equation:

$$MAX = [AT(S_1) + BASE] - [DT(S_2)].$$

11. Method of claim 1, wherein the step of establishing BASE comprises, at least, the steps of:

measuring the thrust ("P") on the valve stem, during baseline running conditions;

determining a value ("$S_1$") of the stem factor at baseline condition, which stem factor represents the efficiency of the stem/stem-nut drive of the valve system; and calculating BASE from the equation:

$$BASE = PS_1.$$

12. Method of claim 11, wherein the measuring step comprises the steps of mounting stem load measuring device on the valve stem; and monitoring the output of the stem load measuring device during operation of the valve system under baseline running conditions.

13. Method of claim 11, wherein the step of determining MAX comprises, at least, the steps of:

determining the total actuator output torque available to the valve stem between zero torque and torque at torque switch trip, during baseline running conditions;

determining the minimum actuator output torque required to overcome the maximum anticipated differential pressure, during a condition of maximum allowable degredation of the valve stem; and calculating MAX as the difference between the total actuator output torque available and the minimum actuator output torque required at the predicted degraded condition.

14. Method of claim 11, wherein the step of establishing MAX comprises, at least, the steps of:

determining a value ("AT") of the amount of stem thrust available to the valve actuator between the running load and the thrust at torque switch trip, during baseline running conditions;

determining a value ("DT") of the stem thrust required to operate the valve under maximum anticipated differential pressure;

determining a value ("$S_2$") of the stem factor representing a maximum predicted degredation of stem/stem nut efficiency; and calculating MAX from the equation:

$$MAX = [AT(S_1) + BASE] - [DT(S_2)].$$

15. Method of claim 1, wherein the motor of the motor operated valve system is an AC motor and wherein the step of establishing a value of a selected power related parameter comprises the step of:

establishing, for the valve system, a value of the AC motor load during baseline running conditions; and wherein the step of determining a warning value comprises the step of:

determining a warning value of motor load as equal to the warning level percentage of the established baseline motor load; and wherein the step of monitoring the selected power related parameter comprises the step of:

monitoring the motor load associated with the valve system during valve-in-use conditions: and wherein the step of evaluating changes in the value of the selected power related parameter comprises the step of:

evaluating changes in the motor load value over the monitoring period.

16. Method of claim 1, wherein the motor of the motor operated valve system is a DC motor and wherein the step of establishing a value of a selected power related parameter comprises the step of:

establishing, for the valve system, a value of the DC motor torque factor during baseline running conditions; and wherein the step of determining a warning value comprises the step of:

determining a warning value of motor torque factor as equal to the warning level percentage of the established baseline motor torque factor; and wherein the step of monitoring the selected power related parameter comprises the step of:

monitoring the motor torque factor associated with the valve system during valve-in-use conditions; and wherein the step of evaluating changes in the value of the selected power related parameter comprises the step of:

evaluating changes in the motor torque factor value over the monitoring period.

17. Method of claim 1, wherein the motor of the motor operated valve system is a DC motor and wherein the step of establishing a value of a selected power related parameter comprises the step of:

establishing, for the valve system, a value of the DC motor torque during baseline running conditions; and wherein the step of determining a warning value comprises the step of:

determining a warning value of motor torque as equal to the warning level percentage of the established baseline motor torque; and wherein the step of monitoring the selected power related parameter comprises the step of:

monitoring the motor torque associated with the valve system during valve-in-use conditions; and wherein the step of evaluating changes in the value of the selected power related parameter comprises the step of:

evaluating changes in the motor torque value over the monitoring period.

* * * * *